United States Patent [19]

Berry et al.

[11] Patent Number: 5,953,676

[45] Date of Patent: Sep. 14, 1999

[54] FIXED WIRELESS COMMUNICATION SYSTEM AND METHOD FOR ORIGINATING A CALL

[75] Inventors: Kirk Berry, Germantown; Louis King, Mt. Airy; Ali Sajassi, Germantown, all of Md.

[73] Assignee: Hughes Electronics Corporation, El Segundo, Calif.

[21] Appl. No.: 08/918,470

[22] Filed: Aug. 26, 1997

Related U.S. Application Data

[63] Continuation of application No. 08/668,984, Jun. 24, 1996, abandoned, which is a continuation of application No. 08/337,698, Nov. 10, 1994, abandoned.

[51] Int. Cl.[6] .................................................. H04Q 7/20
[52] U.S. Cl. ........................ 455/564; 455/403; 455/422; 455/517
[58] Field of Search .................................... 455/422, 517, 455/561, 560, 564, 466, 403, 554, 555, 426, 432, 435, 436, 445; 379/355

[56] References Cited

U.S. PATENT DOCUMENTS

| | | |
|---|---|---|
| 3,912,875 | 10/1975 | Katz . |
| 4,268,722 | 5/1981 | Little et al. .................................. 179/2 |
| 4,890,315 | 12/1989 | Bendixen et al. ....................... 455/554 |
| 4,922,517 | 5/1990 | West, Jr. et al. . |
| 4,975,941 | 12/1990 | Morganstein et al. .................... 379/88 |
| 5,550,897 | 8/1996 | Seiderman ................................. 379/59 |
| 5,703,933 | 12/1997 | Ghisler ..................................... 455/422 |

OTHER PUBLICATIONS

Motorola Model Q1372A IMTS Subscriber Unit Product Specification, Jan. 12, 1973.
William Stalling, *Data and Computer Communications* 1985, pp. 130–139.

*Primary Examiner*—Dwayne D. Bost
*Assistant Examiner*—Nay A. Maung
*Attorney, Agent, or Firm*—John T. Whelan; Michael W. Sales

[57] ABSTRACT

An improved fixed wired system and method of originating a call in a fixed wired system in which a remote station (10), which is wired to a communication terminal (15), such as a standard telephone, detects an off-hook state of the communication terminal (15), transmits a call origination request signal to a base station (20,25) via a radio link in response to the off-hook state detection, and delivers a dial tone to the communication terminal (15) upon receiving an acknowledgment from the base station (20,25). After a dial tone is delivered to the communication terminal (15) and the user begins dialing a directory number, the remote station (10) collects the dialed digits and forwards the dialed digits separately or in groups, to the base station (20,25) where the digits are analyzed to determine whether a complete directory number has been dialed. When the base station (20,25) detects that a complete directory number has been dialed, it forwards the dialed digits to a communication network (40), such as a public switched telephone network or an integrated services digital network for further processing.

33 Claims, 6 Drawing Sheets

FIXED WIRELESS COMMUNICATION SYSTEM AND METHOD FOR ORIGINATING A CALL

This application is a Continuation of application Ser. No. 08/668,984 filed on Jun. 24, 1996, now abandoned, which is a Continuation of application Ser. No. 08/337,698 filed on Nov. 10, 1994, now abandoned.

BACKGROUND OF THE INVENTION

1. Field of the Invention

The present invention relates to a method and system for establishing a call on a communication network. More particularly, the present invention relates to an improved method and system for transmitting dialed digits from a remote station to a base station in a fixed wireless system.

2. Discussion of the Related Art

In conventional telephone networks, telephones (or more broadly, the communication terminals) are connected to local switching facilities by local telephone lines, and the switching facilities are interconnected via trunk lines. Depending upon the geographic distribution of the population the telephone network is to serve, the cost of installing local telephone lines may be prohibitive. For this reason, some of the more sparsely populated areas in the world do not have access to a public communication network.

In an effort to bring modern communication to these sparsely populated areas, a system known as a fixed wireless system has been developed. In general, a fixed wireless system replaces the local telephone lines with a wireless radio link that operates in a manner similar to cellular networks. These fixed wireless systems typically do not require specialized communication terminals, but permit standard telephones, fax machines, and computers modems to be used.

An example of a fixed wireless system is shown in FIG. 1. The fixed wireless system includes remote stations 10 to which telephones 15 are wire connected, base stations 20 and 25, and at least one mobile switching center 30, which provides a gateway to a communication network 40.

In general, remote stations 10 include a cellular transmit/receive module and an interface, which permits a standard telephone 15 and a standard cellular transmit/receive module to interact.

Base stations 20 typically include transmit/receive modules, a processor, and an interface for connecting base stations 20 with mobile switching center 30. Base stations 20 communicate with mobile telephones 16 and portable telephones 17, as well as remote stations 20, via radio links. Base stations may also take the form of base station 25 in which a base station controller 26 controls one or more base transceiver stations 28.

An example of a fixed wireless system is described in U.S. Pat. Nos. 4,922,517 and 4,775,997 issued to West, Jr. et al. In the system disclosed in these patents, a processor is provided in the remote stations to simulate a conventional telephone network. More specifically, the processor provides a simulated dial tone to the telephone when the telephone is taken off-hook, performs a digit analysis to determine when the last digit has been dialed, and transmits all the dialed digits to a base station upon determining that dialing is complete. Thus, unlike conventional cellular systems, the user is provided with a dial tone and does not have to press a "SEND" key after entering all the digits to originate the call request.

One problem associated with having a processor in the remote station provide a simulated dial tone to the telephone in response to the telephone being taken off-hook is that the simulated dial tone may not accurately reflect whether a connection can be made with the communication network, whereas a real dial tone indicates that a connection with the communication network has actually been established. If, for example, the only base station in range is congested with traffic and is not accepting additional calls, the processor in a remote station will inaccurately provide a simulated dial tone to the connected telephone, giving the user the false impression that the call will go through.

Another problem with the above described system arises from the various calling protocols and dialing plans existing in different countries (i.e., the number of digits required to make a call). In order to accommodate the calling protocols of a particular country, digit analysis performed by the processors in the remote stations must be modified. Moreover, if the calling protocol in a country is modified after the fixed wireless system is installed, every remote station must be altered to accommodate the modification. Because these remote stations are numerous and variously located at numerous homes and offices, the cost of installation or subsequent modification becomes excessive.

SUMMARY OF THE INVENTION

Accordingly, the present invention has been made in view of the above circumstances and has as an advantage of providing a fixed wireless system that provides the appearance of a conventional wired communication system.

A further advantage of the present invention is to provide a fixed wireless system in which installation and modifications can more readily be made to accommodate variations between public communication network standards of different countries and to accommodate future upgrades to the system.

Yet another advantage of the present invention is to provide a wireless system in which a dial tone is delivered to a communication device after a base station acknowledges the availability of a communication band and trunk line.

Additional features and advantages of the invention will be set forth in part in the description which follows and in part will be apparent from the description, or may be learned by practice of the invention. The features and advantages of the invention may be realized and attained by means of the instrumentalities and combinations particularly pointed out in the written description and claims hereof as well as the appended drawings.

Moreover, the above features and advantages may be achieved by one method of the present invention. This method of the present invention involves the transmission of digits entered into a communication terminal connected to a fixed wireless system having a base station connected to a communication network and a remote station connected to the communication terminal for transmitting and receiving signals to/from the base station via a radio link, and comprises the steps of receiving digits entered from the communication terminal at the remote station, transmitting a first set of the received digits from the remote station to the base station, transmitting a digit acknowledgment signal from the base station to the remote station upon receiving a set of digits from the remote station to indicate the receipt of the set of digits; and transmitting the remaining received digits from the remote station to the base station in response to the receipt of the digit acknowledgment signal transmitted by the base station indicating that the base station received the previously transmitted set of digits.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENT

Reference will now be made in detail to the present preferred embodiment of the invention, an example of which is illustrated in the accompanying drawings.

Figure 1:
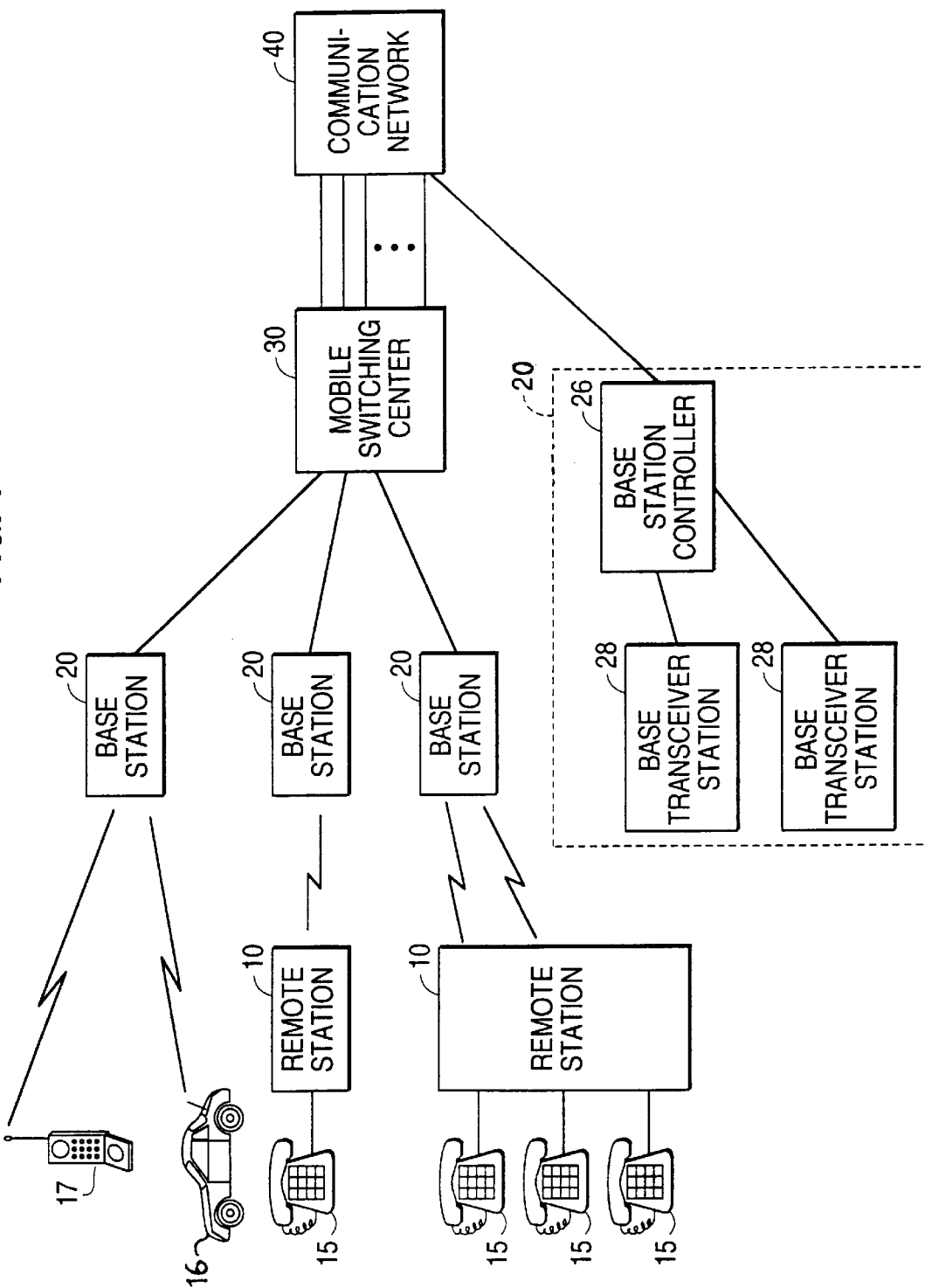
FIG. 1 is a block diagram showing a communication system employing a fixed wireless system.

A communication system that may incorporate the exemplary embodiment of the fixed wireless system of the present invention is shown in FIG. 1. A general description of the communication system shown in FIG. 1 is provided above. General descriptions of the preferred structures of the remote stations and base stations are provided below to illustrate examples of one type of fixed wireless system in which the present invention may be implemented. The present invention, however, is directed to a particular protocol performed between the remote stations and the base stations and is not limited to implementation in a fixed wireless system having any particular structure.

In the preferred system described below, the preferred method of radio transmission is the E-TDMA® communications system, which is a proprietary time division multiple access (TDMA) communications system wherein sampled packets of voice data (PCM data) are discarded when no voice signal is present in order to avoid congestion in the system.

Figure 2:
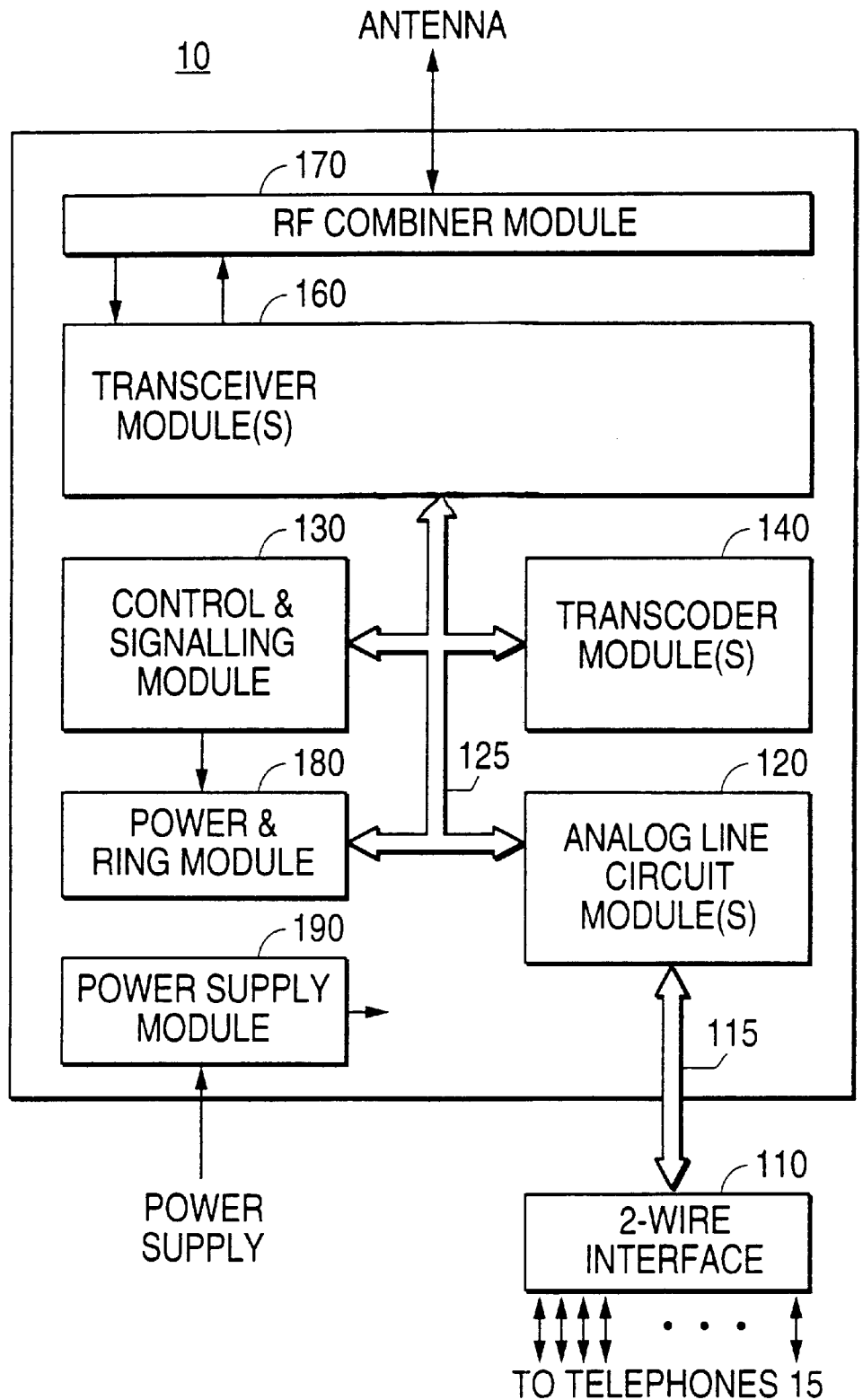
FIG. 2 is a block diagram showing a remote station constructed in accordance with the present invention.

FIG. 2 shows the preferred general structure of remote station of the present invention, generally indicated at 10. Remote station 10 includes a 2-wire interface 110, a telephone interface bus 115, an analog line circuit module 120, a control and data bus 125, a control and signalling module 130, a transcoder module 140, a transceiver module 160, an RF combiner module 170, a power and ring module 180, and a power supply module 190.

Remote station 10 may be configured as a single subscriber unit or a multiple subscriber unit. As a multiple subscriber unit, remote station 10 may be modified to accommodate telephone lines from a number of subscribers. In particular, additional analog line circuit modules 120, transcoder modules 140, and transceiver modules 160 may then be included.

The 2-wire interface 110 provides connections to telephones 15 and connects the telephone lines to analog line circuit module 120 via telephone interface bus 115. Although a 2-wire interface is shown, it is possible to utilize a 4-wire interface for connection to a private branch exchange (PBX).

Analog line circuit module 120 handles line activation and deactivation, performs the functions of a hybrid, performs off/on-hook detection and ring-trip detection, converts analog telephone line signals into PCM samples, provides a relay for connection of the line to power and ring module 180, and provides secondary 2-wire line protection.

Control and signalling module 130 provides overall control of the modules of remote station 10. Specifically, control and signalling module 130 manages on/off-hook processing, ring control, and the collection of dialed digits; assigns voice coders to analog line circuit module 120; performs call processing support and messaging; voice spurt-by-spurt management of transmitters and receivers of transceiver module 160; controls inter-module data paths and movement of data between the modules; generates a carrier reference; and controls timing.

Transcoder module 140 preferably includes a plurality of transcoders, which are assigned on a per call basis by control and signalling module 130. When the system utilizes the proprietary E-TDMA® communications system, transcoder module 140 preferably performs speech compression and expansion in conjunction with a voice activity detector in order to remove PCM data that merely represents silence and thereby reduces traffic between the remote and base stations. Transcoder module 140 also performs DTMF tone detection.

Transceiver module 160 includes a digital modem, which may be a general purpose modulator/demodulator and preferably performs FIR filtering, receive band filtering, and analog to digital conversion.

Transceiver module 160 includes a digital signal processor that performs the following functions when transmitting: slot data formatting; interleaving; tuning a transmit frequency synthesizer; controlling the transmission power level; and enabling/disabling the transmission carrier.

When receiving, transceiver module 160 performs the following functions: de-interleaving; tuning a receive frequency synthesizer; and RF and IF automatic gain control.

Transceiver module 160 may include any cellular type transceiver. Transceiver module 160 preferably performs the following additional functions: receive bandpass filtering; low noise amplification; RF automatic gain control; down conversion to IF; IF amplification; IF automatic gain control; receive IQ demodulation to baseband; local oscillator and synthesizer; transmit frequency synthesis; transmit power level control; transmit bandpass filtering; and transmit power amplification.

RF combiner module 170 combines transmit carriers from transceiver module 160 and multiplexes them with receive signals at the antenna connector. RF combiner module 170 also separates the signals received from the antenna and amplifies and routes them to the desired transceiver module 170.

Power and ring module 180 provides power to the connected telephones and generates a ring signal, which is delivered to the telephones.

Power supply module 190 receives power from either an AC or DC source and converts the supplied power to a power level that is acceptable to the modules forming remote station 10.

Figure 3:
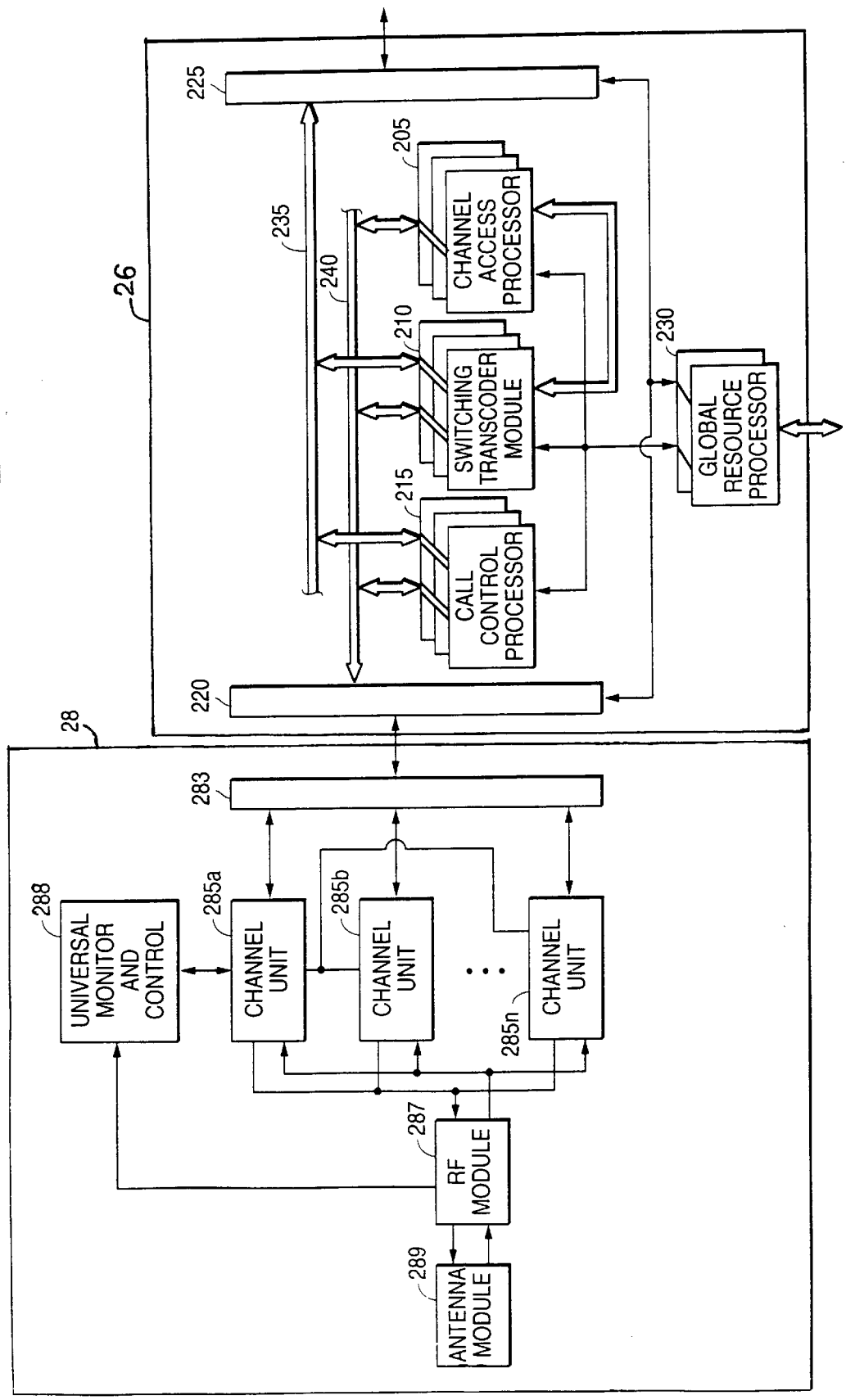
FIG. 3 is a block diagram showing a base station constructed in accordance the present invention.

FIG. 3 shows the general structure of a base station 20 constructed in accordance with the present invention.

Base station 20 includes a base station controller 26 and at least one base transceiver station 28. Base station controller 26 includes a channel allocation processor (CAP) 205, a switching transcoder module (STM) 210, a call control processor (CCP) 215, an I/O transceiver interface 220, at least one I/O PSTN interface 225, a global resource processor (GRP) 230, a first I/O bus 235, and a second I/O bus 240.

Base transceiver station 28 generally includes a controller interface 283, a plurality of channel units 285a, 285b, . . . , 285n, an RF module 287, a universal monitor and control module 288, and an antenna module 289.

Controller interface 283 transmits and receives voice signals to and from the I/O transceiver interface 220 of the control portion of the base station.

Channel units 285 typically include a digital modem, which preferably performs FIR filtering, receive band filtering, and analog to digital conversion and a transceiver, which may be any cellular type transceiver.

RF module 287 combines transmit carriers from channel units 285 and multiplexes them with receive signals at the antenna connector of antenna module 289. RF module 287 also separates the signals received from antenna module 289 and amplifies and routes them to the desired channel unit 285.

Universal monitor and control module 288 monitors the traffic in channel units 285 and controls switchover operations.

In operation, base transceiver station 28 sends and receives speech and control signals over the various channels of the radio link to and from a remote station. The speech and control signals, which base transceiver station transmits to a remote station, are generated by the control portion of base station 20. When base transceiver station 28 receives speech and control signals from a remote station, the received signals are forwarded to base station controller 26 for further processing.

In general, call control processor 215 establishes and terminates calls and terminates the interface with a local switch in the Public Switched Telephone Network (PSTN). Channel allocation processor 205 performs channel management, directs frequency and allocates switching transcoder modules 210, and provides a gateway for interfacing with base transceiver stations 28. Switching transcoder module 210 preferably performs the functions of voice compression/decompression, voice activity detection, comfort noise generation, detection of end-of-speech messages, message transport, signal quality measurement, and traffic path switching. Global resource processor 230 controls the allocation of base station control resources and communicates with other base stations via a local area network, preferably an Ethernet.

When the base stations are used to communicate with mobile communication terminals as well as the fixed remote stations, a mobile switching center 30 (FIG. 1) is preferably provided to transfer calls from one base station to another as a mobile communication terminal moves from one cell to another. Mobile switching center 30 may be configured in the same manner as any conventional mobile switching center. Because remote stations 10 are in a fixed location, and hence, remain in a particular cell, it is not necessary that mobile switching center 30 monitor calls to and from communication terminals 15 connected to remote stations 10. Thus, if a base station 20 does not serve mobile communication terminals, that base station 20 may be directly connected to an end office of communication network 40.

Figure 4:
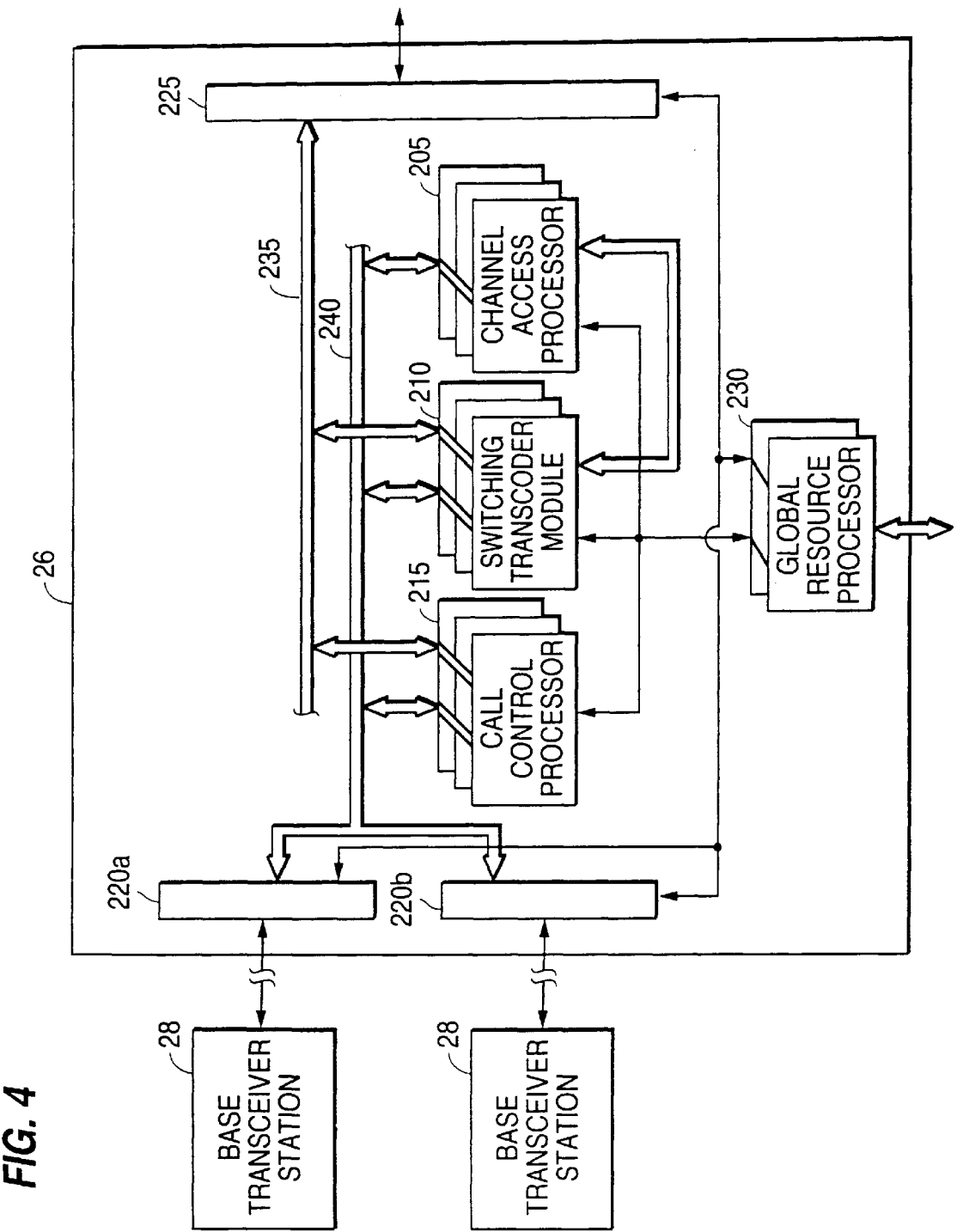
FIG. 4 is a block diagram showing a base transceiver station constructed in accordance with the present invention.

FIG. 4 shows the general structure of a base station 20 including a plurality of base transceiver stations 28. To accommodate additional base stations transceivers 28, base station controller 26 is modified to include an I/O transceiver interface 220a and 220b for each base transceiver station 28.

Figure 5:
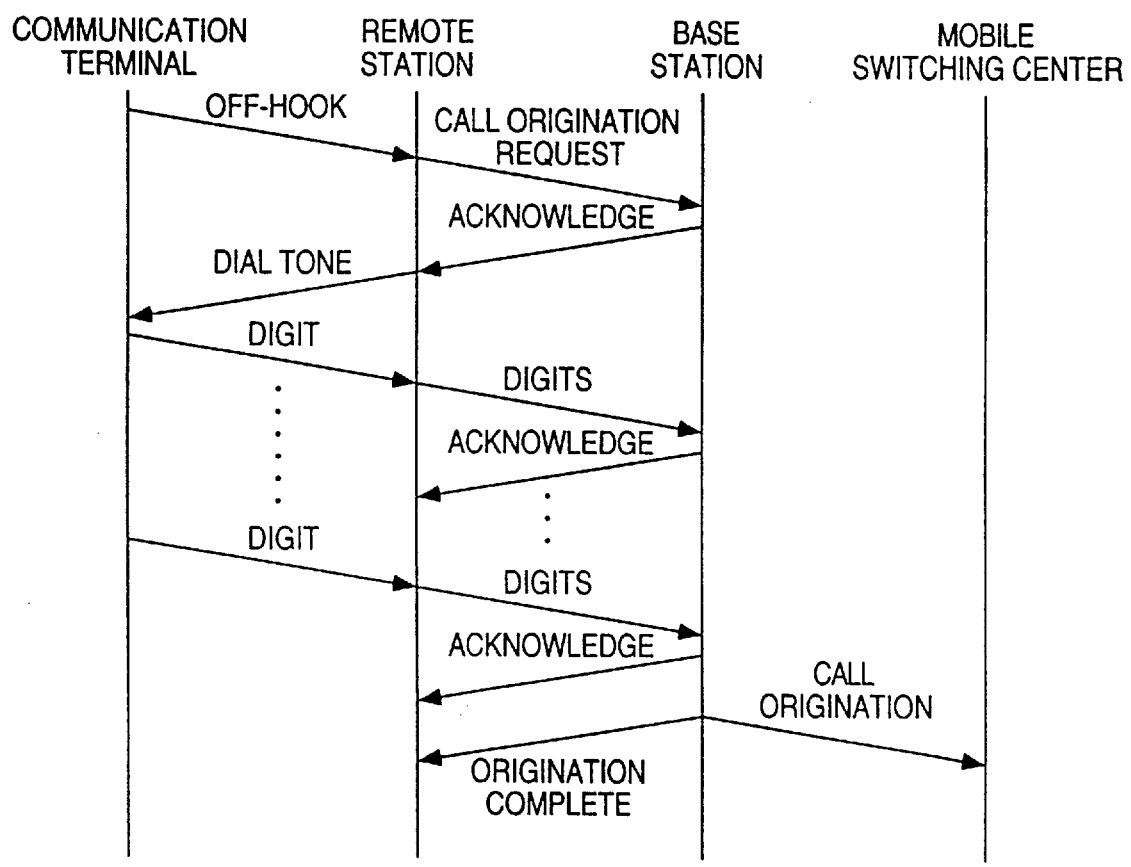
FIG. 5 is a ladder diagram illustrating the operation of the present invention when communicating through a mobile switching center.

FIG. 5 illustrates the operation of the present invention when communicating with mobile switching center 30, which will now be described with reference to FIGS. 1–3.

As with a standard telephone connected to a wired telephone network, a communication terminal (which may be a standard telephone or computer terminal) connected to a fixed wireless telephone system, transmits an off-hook signal when it is taken off-hook. The off-hook signal is detected by analog line circuit module 120 of remote station 10 via 2-wire interface 110. Upon detecting the off-hook signal, analog line circuit module 120 notifies control and signalling module 130 via bus 125. Control and signalling module 130 subsequently performs off-hook processing and instructs transceiver module 160 to transmit a call origination request signal to base station 20.

Switching transcoder module 210 in base station 20 receives the call origination request via base transceiver station 28, I/O transceiver interface 220, and second I/O bus 240, and forwards the call origination request to channel allocation processor 205. Channel allocation processor 205 assigns a temporary ID to the call request, checks to determine if connection to the communication network is available by checking system congestion and PSTN trunk availability, assigns a slot in a traffic channel and a tag number to the call request associated with the assigned temporary ID, and instructs switching transcoder module 210 to transmit an acknowledgment signal that includes the assigned tag number and slot in the traffic channel to remote station 10 using the common control channel.

Control and signalling module 130 in remote station 10 receives the acknowledgment via transceiver module 160. Next, control and signalling module 130 instructs analog line circuit module 120 to transmit a dial tone to the communication terminal. Thus, the user of the communication terminal receives a dial tone in the same manner as if the user were using a standard telephone connected to a conventional wired telephone network. Further, because the dial tone is not provided to the communication terminal until base station 20 has determined that a connection with the communication network can be established, the dial tone more accurately informs the user of the connection status.

Upon receiving the dial tone, the user may then dial the digits of the directory number of the party to be called in a conventional manner. As the user dials the digits, control and signalling module 130 collects the digits via analog line circuit module 120 and stores them in memory with the tag assigned by base station 20. Preferably, control and signaling module 130 forwards the dialed digits to channel allocation processor 205 of base station 20 where the dialed digits are analyzed to determine whether a complete directory number has been dialed. By performing the analysis of the dialed digits at base station 20 rather than remote station 10, the system may utilize generic remote stations, which are more numerous than the base stations, and thus the system can be more easily configured and installed to accommodate different dialing plans in different countries. Moreover, should the dialing plan change after a system has been installed, the system may be easily modified to accommodate the changes by modifying the base station software.

In the preferred method described above, control and signalling module 130 may separately forward the dialed digits to base station 20 as they are dialed. However, separately transmitting the digits increases transmission traffic and increases the required resource bandwidth. Therefore, control and signalling module 130 preferably transmits the dialed digits in one or more groups. To define such groups, control and signalling module 130 may transmit groups of N digits, where N is a predefined integer, as soon as the N digits making up the group are dialed. For example, control and signalling module 130 may transmit groups of 3 digits (N=3) each time the third digit of the group is received.

Alternatively, control and signalling module 130 may transmit a group of digits consisting of those digits that it receives within a predetermined time interval. For example, if the predetermined time interval is three seconds, control and signalling module 130 will transmit those digits it has collected during each three second interval.

Control and signalling module 130 may also utilize a combination of a two-digit forwarding criteria, whereby it transmits a group of digits whenever N digits are collected or the predetermined time interval elapses, whichever occurs first. For example, if N=3, the time interval is three seconds, and three digits are received before the three second interval elapses, the three digits are transmitted as soon as they are received, and the time interval is restarted for the next group of digits.

Regardless of the digit forwarding criteria used by control and signalling module 130, however, control and signalling module 130 preferably awaits an acknowledgment signal from base station 20 that the previously transmitted group of digits was received before transmitting a subsequent set of digits. The digits and acknowledgment signals may be transmitted over either the common control channel or the assigned slots in a traffic channel.

When transmitting a set of digits, control and signalling module 130 additionally transmits the assigned tag number, the number of digits, and the last digit position in the same message. In this manner, switching transcoder module 210 of base station 20 can immediately associate the message with the call to be established based on the assigned tag, and channel allocation processor 205 can confirm that all of the transmitted digits have been received based upon a correspondence of the number of digits to be transmitted and the number of digits actually received, and can move a digit position pointer to the position in the allotted memory location where the next set of digits will be stored.

After determining that it has received all of the digits of a transmitted set, channel allocation processor 205 of base station 20 determines whether a complete directory number has been received. If a complete directory number has not been received, channel allocation processor 205 instructs switching transcoder module 210 to transmit an acknowledgment signal indicating that base station 20 is still collecting digits for the call. In addition, the acknowledgment signal indicates the last digit position of the received digits.

On the other hand, if channel allocation processor 205 determines that a complete directory number has been received, it transfers the dialed digits to a call control processor 215 assigned by group resource processor 230.

Call control processor 215 then forwards the collected digits to the communication network over a connecting line, which may be a Signalling System No. 7 (SS7) line, in the same manner as a local subscriber switch would forward dialed digits. Concurrently therewith, channel allocation processor 205 instructs switching transcoder module 210 to send an acknowledgment signal to remote station 10 indicating that a complete call has been dialed and that the digits were forwarded to the communication network.

Control and signalling module 130 of remote station 10 starts a timer each time it transmits a message including dialed digits. If control and signalling module 130 does not receive an acknowledgment signal from base station 20 before the timer counts to a predefined interval, control and signalling module 130 transmits a message to base station 20 including all digits from the last digit position acknowledged by base station 20 to the end of the current string of received digits. In this manner, receipt of all the transmitted digits by the base station can be assured without requiring that all the dialed digits be retransmitted.

Figure 6:
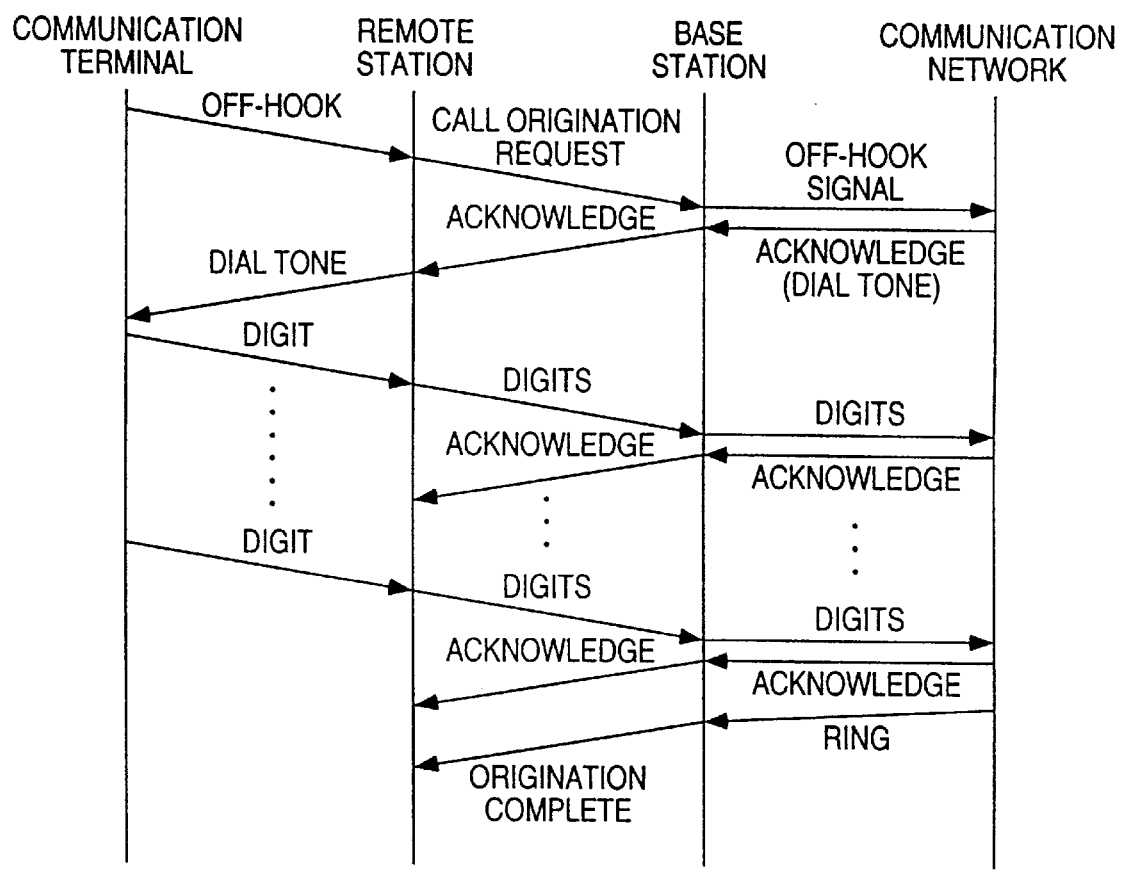
FIG. 6 is a ladder diagram illustrating the operation of the present invention when communicating directing to an end office of a communication network.

FIG. 6 illustrates the operation of the present invention when communicating directly with communication network 40, which will now be described with reference to FIGS. 1–3.

When base station 20 communicates directly with communication network 40, base station 20 acts more as a conduit than when communicating through mobile switching center 30. The fact that the communication is carried out either directly with communication network 40 or mobile switching center 30 is transparent to communication terminal 15 and remote station 10. Thus, the description of the operation of communication terminal 15 and remote station 10 is omitted.

As shown in FIG. 6, when base station 20 receives a call origination request from remote station 10, it outputs an off-hook trip signal to communication network 40 similar to the off-hook trip signal communication network 40 would receive from a standard telephone directly connected thereto. In response, communication network 40 sends an acknowledgment signal back in the form of a dial tone.

As base station 20 receives the digits from remote station 10, it forwards the digits to communication network 40. Communication network 40 collects the digits and performs an analysis to determine whether a complete directory number has been dialed. Once communication network 40 has determined that a complete directory number has been dialed, it sends a ring trip signal to base station 20. Base station 20 then sends an origination complete signal to remote station 10.

Although the operation of the present invention has been described with reference to the particular structures of the remote stations and base stations, as shown in FIGS. 2 and 3, respectively, the methods of the present invention may be implemented with any remote station and base station. Moreover, the present invention may be implemented in a base station and a mobile communication device, such as a car telephone or a portable telephone, provided the transceiver unit of the mobile communication device is capable of performing the necessary steps described above and recited in the claims below.

Further, although the preferred embodiment has been described as using E-TDMA®, the present invention may be embodied in a system utilizing IS-54, GSM, or any other form of transmission.

The term "dialed" digits used in the above description of the present invention is not limited to digits dialed on a rotary telephone, rather the term generically refers to digits entered at, or otherwise transmitted from, a communication terminal. Thus, the term "dialed" digits includes dual tone multi-frequency (DTMF) digits.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. In a fixed wireless system comprising a base station, a switching center, and a remote station, the base station including a radio transmit/receive module for communicating via a radio link with the remote station and a base station interface for connecting the base station with the switching center, the switching center including a first interface for connecting the switching center with the base station and a second interface for routing calls through a switched communications network, the remote station including a radio transmit/receive module for communicating via the radio link with the base station and a terminal interface for connecting a communication terminal to the remote station, a method of originating a call via the radio link between the remote station and the base station, the method comprising the steps of:

providing a simulated dial tone at the communication terminal in response to an off-hook condition of the communication terminal only upon receiving an origination acknowledgment signal form the base station;

receiving digits entered from the communication terminal at the remote station;

transmitting a first set of the received digits from the remote station to the base station; and transmitting any remaining received digits from the remote station to the base station in response to receipt of a digit acknowledgment signal transmitted by the base station indicating that the base station received the previously transmitted set of digits.

2. The method of claim 1, wherein the first set of received digits consists of the first received digit.

3. The method of claim 1, wherein the first set of received digits consists of digits received from the communication terminal within a predetermined time interval.

4. The method of claim 1, wherein the first set of the received digits consists of the first N digits received from the communication terminal, where N represents a predetermined number of digits.

5. The method of claim 1, wherein the first set of the received digits consists of either (1) digits received from the communication terminal within a predetermined time interval, or (2) the first N digits received from the communication terminal, where N represents a predetermined number of digits received before the expiration of the predetermined time interval.

6. The method of claim 1, wherein the remaining received digits are transmitted in a plurality of additional sets of the received digits from the remote station to the base station, each additional set of received digits being transmitted in response to the receipt of digit acknowledgment signals transmitted by the base station, each digit acknowledgment signal indicating that the base station received the previous transmitted set of digits.

7. The method of claim 6, wherein the first set of received digits and each additional set of received digits consist of digits received from the communication terminal within a predetermined time interval.

8. The method of claim 6, wherein the first set of the received digits and each additional set of received digits consist of N digits received from the communication terminal, where N represents a predetermined number of digits.

9. The method of claim 6, wherein the first set of received digits and each additional set of received digits consist of either (1) digits received from the communication terminal within a predetermined time interval, or (2) N digits received from the communication terminal, where N represents a predetermined number of digits received before the expiration of the predetermined time interval.

10. In a fixed wireless system comprising a base station, a switching center, and a remote station, the base station including a radio transmit/receive module for communicating via a radio link with the remote station and a base station interface for connecting the base station with the switching center, the switching center including a first interface for connecting the switching center with the base station and a second interface for routing calls through a switched communications network, the remote station including a radio transmit/receive module for communicating via the radio link with the base station and a terminal interface for connecting a communication terminal to the remote station, a method of originating a call via the radio link between the remote station and the base station, the method comprising the steps of:

providing a simulated dial tone at the communication terminal in response to an off-hook condition of the communication terminal only upon receiving an origination acknowledgment signal form the base station;

receiving digits entered from the communication terminal at the remote station;

transmitting a first set of the received digits from the remote station to the base station;

transmitting a digit acknowledgment signal from the base station to the remote station upon receiving a set of digits from the remote station to indicate the receipt of the set of digits; and transmitting any remaining received digits from the remote station to the base station in response to the receipt of the digit acknowledgment signal transmitted by the base station indicating that the base station received the previously transmitted set of digits.

11. The method of claim 10, wherein the communication terminal comprises one of a telephone, a computer, and a facsimile device.

12. The method of claim 10, wherein the communication network is a public switched telephone network.

13. The method of claim 10, wherein the communication network is an integrated service digital network.

14. The method of claim 10, further comprising the steps of:

analyzing all of the digits received from the remote station at the base station to determine whether a complete directory number has been dialed; and forwarding a call origination request signal, said call origination request signal including all the dialed digits from the base station to the communication network for further processing of the call.

15. The method of claim 10, wherein the communication terminal comprises one of a mobile telephone and a portable telephone, and the remote station comprises a transmit/receive module of the mobile/portable telephone.

16. In a fixed wireless system comprising a base station, a switching center, and a remote station, the base station including a radio transmit/receive module for communicating via a radio link with the remote station and a base station interface for connecting the base station with the switching center, the switching center including a first interface for connecting the switching center with the base station and a second interface for routing calls through a switched communications network, the remote station including a radio transmit/receive module for communicating via the radio link with the base station and a terminal interface for connecting a communication terminal to the remote station, a method of originating a call via the radio link between the remote station and the base station, the method comprising the steps of:

provi ding a simulated dial tone at the communication terminal in response to an off-hook condition of the communication terminal only upon receiving an origination acknowledgment signal form the base station;

receiving digits entered from the communication terminal at the remote station;

counting the received digits until a predetermined number N digits are received;

transmitting the predetermined number N of the received digits from the remote station to the base station;

repeating the steps of receiving, counting, and transmitting N digits each time an acknowledgment signal is received from the base station until all of the digits entered from the communication terminal have been transmitted or until a complete directory number acknowledgment signal is received from the base station.

17. The method of claim 16, wherein, in the step of transmitting digits, less than N digits are transmitted if N digits are not received within a predetermined time interval.

18. A remote station for use in a wireless system, which processes calls between a communication terminal and a switched communication network, the wireless system having a base station, and a switching center, the base station including a radio transmit/receive module for communicating via a radio link with the remote station and a base station interface for connecting the base station with the switching center, the switching center including a first interface for connecting the switching center with the base station and a second interface for routing calls through the switched communications network, the remote station comprising:

an input terminal for receiving digits entered from the communication terminal, the communication terminal receiving a simulated dial tone in response to an off-hook condition of the communication terminal only upon receiving an origination acknowledgment signal form the base station; and a radio transmitter for transmitting a first set of the received digits to the base station via the radio link, wherein said transmitter transmits any remaining received digits to the base station in response to a receipt of a digit acknowledgment signal transmitted by the base station indicating that the base station received a previously transmitted set of digits.

19. The remote station of claim 18, wherein said transmitter transmits a call origination request to the base station when the communication terminal is taken off-hook, and provides a dial tone to the communication terminal upon receiving an origination acknowledgment signal from the base station.

20. A remote station for use in a wireless system, which processes calls between a communication terminal and a switched communication network, the wireless system having a base station, and a switching center, the base station including a radio transmit/receive module for communicating via a radio link with the remote station and a base station interface for connecting the base station with the switching center, the switching center including a first interface for connecting the switching center with the base station and a second interface for routing calls through the switched communications network, the remote station comprising:

an input terminal for receiving digits entered from the communication terminal, the communication terminal receiving a simulated dial tone in response to an off-hook condition of the communication terminal only upon receiving an origination acknowledgment signal form the base station; and a counter for counting the received digits until a predetermined number N digits are received; and a transmitter for transmitting the predetermined number N of the received digits to the base station via the radio link, wherein said transmitter transmits additional sets of N digits to the base station each time an acknowledgment signal is received from the base station until all of the digits entered form the communication terminal have been transmitted or until a complete directory number acknowledgment signal is received from the base station.

21. The remote station of claim 20, further comprising a timer for timing an interval starting when the communication terminal is taken off-hook or when said transmitter transmits a set of digits and ending a predetermined time thereafter, wherein said transmitter transmits less than N digits if N digits are not received before said timer reaches the predetermined time.

22. A fixed wireless system for processing calls between a communication terminal and a switched communication network, the system comprising:

a base station, including a radio transmit/receive module for communicating via a radio link with a remote station and a base station interface for connecting the base station with a switching center, the switching center including a first interface for connecting the switching center with the base station and a second interface for routing calls through the switched communications network, and the remote station including a radio transmit/receive module for communicating via the radio link with the base station and a terminal interface for connecting the communication terminal to the remote station, the remote station for receiving digits entered from the communication terminal and for transmitting a first set of the received digits to said base station via the radio link, the communication terminal receiving a simulated dial tone upon an off-hook condition at the communication terminal only upon receiving an origination acknowledgment signal form the base station;

wherein said base station transmits a digit acknowledgment signal to said remote station upon receiving the first set of the received digits from said remote station to indicate the receipt of the set of received digits and wherein said remote station transmits any remaining received digits to said base station in response to the receipt of the digit acknowledgment signal transmitted by said base station indicating that said base station received a previously transmitted set of digits.

23. The fixed wireless system of claim 22, wherein the communication terminal comprises one of a telephone, a computer, and a facsimile device.

24. The fixed wireless system of claim 22, wherein the communication network is a public switched telephone network.

25. The fixed wireless system of claim 22, wherein the communication network is an integrated service digital network.

26. The fixed wireless system of claim 22, wherein the communication terminal comprises one of a mobile telephone and a portable telephone, and the remote station comprises a transmit/receive module of the mobile/portable telephone.

27. The fixed wireless system of claim 22, wherein said base station analyses the digits received from said remote station to determine whether a complete directory number has been dialed, and forwards a call origination request signal including the dialed digits to the communication network for further processing of the call.

28. A wireless system which processes calls between a communication terminal and a switched communication network, comprising:

a remote station;

a base station;

a switching center;

wherein the remote station includes a radio transmitter for communicating with the base station via a radio link, the base station including a radio transmit/receive module for communicating via the radio link with the remote station and a base station interface for connecting the base station with the switching center, the switching center including a first interface for connecting the switching center with the base station and a second interface for routing calls through the switched communications network; and wherein the transmitter transmits a call origination request to the base station when the communication terminal is taken off-hook, and originates and provides a dial tone to the communication terminal only upon receiving an origination acknowledgment signal from the base station.

29. A wireless system as defined in claim 28, wherein:

the remote station further includes an input terminal for receiving digits entered from the communication terminal after the communication terminal receives the dial tone from the transmitter;

the radio transmitter first transmits a first set of received digits to the base station via the radio link; and the transmitter transmits any remaining received digits to the base station in response to a receipt of a digit acknowledgment signal transmitted by the base station indicating that the base station received a previously transmitted set of digits.

30. In a fixed wireless system comprising a base station, a switching center, and a remote station, the base station including a radio transmit/receive module for communicating via a radio link with the remote station and a base station interface for connecting the base station with the switching center, the switching center including a first interface for connecting the switching center with the base station and a second interface for routing calls through a switched communications network, the remote station including a radio transmit/receive module for communicating via the radio link with the base station and a terminal interface for connecting a communication terminal to the remote station, a method of originating a call via the radio link between the remote station and the base station, the method comprising the steps of:

receiving digits entered from the communication terminal at the remote station;

transmitting the received digits from the remote station to the base station;

analyzing all of the digits received from the remote station at the base station to determine whether a complete directory number has been dialed; and forwarding a call origination request signal, upon an off-hook condition, said call origination request signal including all the dialed digits for the complete directory number from the base station to the communication network for further processing of the call including initiating a simulated dial tone to the communication terminal only upon receiving an origination acknowledgment signal form the base station.

31. The method of claim 30, wherein the step of transmitting the received digits from the remote station to the base station comprises the steps of:

transmitting a first set of the received digits from the remote station to the base station;

transmitting a digit acknowledgment signal from the base station to the remote station upon receiving a set of digits from the remote station to indicate the receipt of the set of digits; and transmitting any remaining received digits from the remote station to the base station in response to the receipt of the digit acknowledgment signal transmitted by the base station indicating that the base station received the previously transmitted set of digits.

32. A fixed wireless system for processing calls between a communication terminal and a switched communication network, the system comprising:

a base station including a radio transmit/receive module for communicating via a radio link with a remote station and a base station interface for connecting the base station with a switching center, the switching center including a first interface for connecting the switching center with the base station and a second interface for routing calls through the switched communications network and for acknowledging an off-hook condition and initiating a simulated dial tone at the communication terminal, only upon receiving an origination acknowledgment signal form the base station; and the remote station including a radio transmit/receive module for communicating via the radio link with the base station and a terminal interface for connecting the communication terminal to the remote station, the remote station for receiving digits entered from the communication terminal and for transmitting the received digits to said base station via a radio link;

wherein the base station analyzes the digits received from the remote station to determine whether a complete directory number has been dialed, and forwards a call origination request signal including the dialed digits for the complete directory number to the communication network for further processing of the call.

33. A fixed wireless system as defined in claim 32, wherein:
the remote station transmits the received digits to the base station by transmitting a first set of the received digits to said base station via the radio link; and
the base station transmits a digit acknowledgment signal to said remote station upon receiving the first set of the received digits from said remote station to indicate the receipt of the set of received digits and wherein said remote station transmits any remaining received digits to said base station in response to the receipt of the digit acknowledgment signal transmitted by said base station indicating that said base station received a previously transmitted set of digits.

* * * * *